(12) United States Patent
Burkarth et al.

(10) Patent No.: US 10,136,065 B2
(45) Date of Patent: Nov. 20, 2018

(54) METHOD FOR THE TRANSFORMATION OF A MOVING IMAGE SEQUENCE AND MOVING IMAGE SEQUENCE TRANSFORMATION DEVICE

(71) Applicant: PRODAD GMBH, Immendingen (DE)

(72) Inventors: Holger Burkarth, Immendingen (DE); Andreas Huber, Immendingen (DE)

(73) Assignee: Prodad GmbH, Immendingen (DE)

( * ) Notice: Subject to any disclaimer, the term of this patent is extended or adjusted under 35 U.S.C. 154(b) by 5 days.

(21) Appl. No.: 15/317,534

(22) PCT Filed: Jun. 11, 2015

(86) PCT No.: PCT/EP2015/063081
§ 371 (c)(1),
(2) Date: Apr. 24, 2017

(87) PCT Pub. No.: WO2015/189339
PCT Pub. Date: Dec. 17, 2015

(65) Prior Publication Data
US 2017/0237886 A1    Aug. 17, 2017

(30) Foreign Application Priority Data
Jun. 11, 2014 (DE) .......................... 10 2014 108 189

(51) Int. Cl.
*H04N 5/228* (2006.01)
*H04N 5/232* (2006.01)
*G06T 5/00* (2006.01)

(52) U.S. Cl.
CPC ....... *H04N 5/2329* (2013.01); *H04N 5/23248* (2013.01); *H04N 5/23254* (2013.01); *G06T 5/003* (2013.01)

(58) Field of Classification Search
None
See application file for complete search history.

(56) References Cited

U.S. PATENT DOCUMENTS

2004/0218062 A1    11/2004  Silverstein et al.
2007/0147706 A1*   6/2007   Sasaki ................ H04N 5/23248
                                                         382/295

(Continued)

OTHER PUBLICATIONS

Baker et al., "Removing Rolling Shutter Wobble", Microsoft Corporation, pp. 2392-2399.

(Continued)

*Primary Examiner* — Twyler Haskins
*Assistant Examiner* — Wesley Chiu
(74) *Attorney, Agent, or Firm* — Bachman & LaPointe, PC

(57) ABSTRACT

A method is provided for the transformation of a moving image sequence and a moving image sequence transformation device designed for executing the transformation method. For a current individual image of the moving image sequence, the method forms a transformation basis (1) in which a first individual image, the current individual image, and a second individual image are arranged adjacent to each other. Intersection points (S1, S2) are determined for connecting lines (7, 8) which extend from image points corresponding to each other from the first individual image and the current individual image and from the current individual image to the second individual image, comprising image starting limits and image end limits (15, 16) of the current individual image. A new image point position of an image point in the current individual image results from averaging the intersection points.

20 Claims, 5 Drawing Sheets

(56) References Cited

U.S. PATENT DOCUMENTS

| | | | |
|---|---|---|---|
| 2009/0066813 A1* | 3/2009 | Shibata | H04N 5/335 348/231.99 |
| 2009/0160957 A1* | 6/2009 | Deng | H04N 5/23248 348/208.99 |
| 2011/0176043 A1* | 7/2011 | Baker | G06T 5/003 348/296 |
| 2011/0267514 A1* | 11/2011 | D'Angelo | H04N 5/2329 348/296 |
| 2012/0236124 A1* | 9/2012 | Aoki | G01C 3/085 348/47 |
| 2013/0070121 A1* | 3/2013 | Gu | H04N 5/2329 348/239 |
| 2014/0153840 A1* | 6/2014 | Chiao | H04N 5/235 382/255 |
| 2014/0218569 A1* | 8/2014 | Tsubaki | H04N 5/2329 348/241 |
| 2014/0226033 A1* | 8/2014 | Sendik | G06T 7/2013 348/208.1 |
| 2015/0042826 A1* | 2/2015 | Kenjo | H04N 5/23267 348/208.1 |
| 2015/0085150 A1* | 3/2015 | Silverstein | H04N 5/145 348/208.6 |

OTHER PUBLICATIONS

German Office action for patent application No. 10 2014 108 189.7 dated Jan. 8, 2015.

Horn, Berthold K.P. and Schunck, Brian G.; Determining Optical Flow, Artificial Intelligience, 1981, vol. 17, No. 1-3, pp. 185-203.

Lucas, Bruce D. and Kanade, Takeo; An Interative Image Registration Technique With an Application to Stereo Vision, Proceedings of Imaging Understanding Workshop, 1981, pp. 121-130.

* cited by examiner

METHOD FOR THE TRANSFORMATION OF A MOVING IMAGE SEQUENCE AND MOVING IMAGE SEQUENCE TRANSFORMATION DEVICE

BACKGROUND OF THE INVENTION

The present invention relates to a method for the transformation of a moving image sequence and further to a moving image sequence transformation device.

Camera devices with a digital image sensor for recording a video or a moving image sequence, i.e. a plurality of individual images successively recorded in a storage or a storage medium, are widely used today.

In such camera devices, such as a digital camera or a smartphone, different image sensor types are used with respect to the image detection technique.

In a CCD sensor, a two-dimensional individual image of a moving image sequence, i.e. extending along a horizontal and a vertical axis, which is oriented orthogonally to this horizontal axis, is detected at a predetermined point of time or moment, so that the image points for a respective individual image, which form the individual image, are assigned exactly to one single detection time.

In contrast to the CCD image sensor, when recording a moving image sequence with a CMOS sensor, each individual image of the moving image sequence is detected in image sections, in particular row by row or line by line, wherein two image rows following one after the other in the vertical direction can only be detected with a time offset, i.e. not at the exact same time due to the discharge inertia or slowness of the CMOS sensor. When using a CMOS sensor for the detection of moving image sequences, the rows of an individual image which follow one after the after are detected at different points of time. In contrast, within a respective horizontally extending row of a CMOS sensor, the information forming a row of the individual image are read at the same point of time, i.e. without time offset in the horizontal direction.

Detecting image information row by row at different points of time depending on the vertical row position within the respective individual image is generally problematic for recording a sequence of moved images, i.e. a moving image sequence. For example, if an object, which is recorded on multiple successive individual images in the moving image sequence, moves in the recorded individual images vertically from top to bottom, the object will initially be detected in vertically upward or higher image rows and thus relatively earlier points of time within a detection time interval assigned to the respective individual image. During the vertical downward movement of the object, the object will be detected at an increasingly relatively later point of time within the detection time interval of a respective individual image, because the object is detected in the respective individual image in an image row located further at the bottom.

When recording a moving image sequence with a CMOS sensor with row-based individual image detection, the recorded moving image sequence is often distorted. If, for example, a stationary object is detected from a moved car, for example a strictly vertically extending and stationary lamp post, the lamp post will be put obliquely in the respective individual images, and is thus recorded in a distorted manner that deviates from the strictly vertical orientation. In contrast, an exterior mirror of the car detected in the moving image sequence simultaneously for the above described case, is detected without such distortion in the respective individual images, when no relative movement takes place between the CMOS sensor recording the moving image sequence row by row and the external mirror. This distortion problem caused by recording individual images row by row is also referred to as rolling shutter problem.

A particular problem for image quality of a moving image sequence recorded with a CMOS sensor row by row are shaking or shocks of the CMOS sensor in relation to the recorded environment in the vertical direction. The timely offset row-by-row detection of the respective individual images, which extends across all images, does not only result in the distortion described above, but also in strong wobbling and compression of the individual images of the moving image sequence.

SUMMARY OF THE INVENTION

Thus, the object of the present invention lies with the provision of a method for the transformation of a moving image sequence into a moving image sequence with improved image quality. Thus, the method to be provided by the invention is to be capable of rectifying an image as well as of stabilizing an image of a moving image sequence recorded row by row, in particular with a CMOS sensor. Furthermore, the object of the present invention is to provide a moving image sequence transformation device for improving moving image sequences detected row by row.

In the present application, the term of the "individual image detected row by row" consistently relates to that fact that, as described above, within a time interval for the detection of an individual image, each row of the individual image is detected or recorded at a different detection time within the time interval compared to the vertically adjacent row. Each image row comprises a plurality of horizontally extending image point positions, to which respective image point contents are assigned per row at any time or moment.

The object of the invention is achieved by a method having the features disclosed herein and/or by a device having the features are disclosed. Additional features of further advantageous embodiments are also disclosed.

The method according to the invention for the transformation of a moving image sequence having the object of rectifying and stabilizing the moving image sequence first comprises a step of providing, in a moving image sequence storage, the moving image sequence, which is composed of a plurality of successive individual images, wherein each individual image is assigned to a respective time interval of successive time intervals. Each time interval is determined by the start time and end time, respectively. Each individual image is composed of a plurality of horizontally extending rows or image rows, which are in each case arranged vertically neighboring to one another. Each row comprises multiple image point positions of image points with a respective image content. The respective rows of an individual image are assigned to different relative detection times within the time interval assigned to the individual image, wherein each vertical row position is assigned an unambiguous point of time or detection time.

Hereinafter, it will be understood without limitation that the row of an individual image located uppermost in the vertical direction is read out first and the row of an individual image located undermost in the vertical direction is read out or was read out last when detecting the respective individual image.

Furthermore, the method according to the invention comprises providing, in an image motion information storage, an image motion information which describes a motion flow between individual images of the moving image sequence. The image motion information assigned to two successive individual images can be understood as a differential information between the respective two individual images, wherein the differential information refers to the content illustrated by an image point or a pixel in the preceding image relative to the current image. The differential information can then be illustrated, referring to an image point, as a vector that represents an amount and a direction of a displacement of an image section content, which preferably is an individual image point, from the preceding image to the current image.

A known method for determining such an image motion information is the determination of a so-called optical flow vector field (or also a vector field describing an optical flow or optical motion), in which respective image sections, preferably individual image points, are assigned respective vectors with offset amounts and offset directions. Then, for a respective image section of an individual image, a respective vector describes the motion this image section in successive individual images. Such an image motion information can be determined using known image motion estimation algorithms, for example. A person skilled in the art knows such methods for calculating the optical flow using differential methods, such as the method developed by Horn and Schunck (see "determining optical flow", Artificial Intelligence, Vol. 17, No. 1-3, Pages 185 to 203, of 1981) or the Lucas-Kanade method (see B. D. Lucas and T. Kanadem, "An iterative image registration technique with an application to stereo vision", Proceedings of Imaging understanding workshop, pages 121 to 130, of 1981). Known algorithms for calculation of the optical flow are further implemented in the C-library OpenCV and thus available and usable to the expert without any further problems.

The method according to the invention further comprises transforming the moving image sequence by repeated forming, in each case for a current individual image to be transformed, a transformation base assigned current individual image to be treated. The transformation axis has, a first dimensional axis, a moving image sequence time axis, also referred to as t axis, along which the respective successive individual images of the moving image sequence assigned to time intervals are arranged. Furthermore, the two-dimensional transformation base has, as a second dimensional axis orthogonal to the first dimensional axis, a row succession time axis, which represents the row-dependent relative row offset within a respective individual image. The transformation base is formed for the current individual image in that a first individual image located upstream in time of the current individual image, the first individual image representing a time state prior in time in relation to the current individual image, which is detected later, the current individual image and a second individual image are arranged along the first dimensional axis, i.e. the moving image sequence time axis, wherein the second individual image is located downstream in time of the current individual image, i.e. was detected later than the current individual image. The first, the current and the second individual image are arranged in the transformation base such that the horizontal direction of each individual image, generally referred to as x-axis or x-direction of the individual image, is arranged perpendicular to the first and second dimension of the transformation base. As a result, rows of these individual images assigned to the same relative points of time, with respect to the respective detection time interval of an individual image, are arranged along a straight line specific for the relative point of time of row detection, i.e. along the first dimensional axis.

Each image point of the two-dimensional individual images is assigned an image point position in an image point plane with a first image point dimension and a second image point dimension, which is oriented orthogonal to the first image point dimension. The first image point dimension, in a first dimension of a respective individual image, corresponds to the horizontal direction of the individual image, which is generally referred to as x-direction. The second image point position, in a second dimension of a respective individual image, corresponds to the vertical direction of the individual image, which is generally referred to as y-direction. As a result, the second image point dimension is oriented in the direction of the row succession time axis of the transformation base, i.e. in the direction of the second dimensional axis of the transformation base. In contrast, the first image point dimension is oriented orthogonally to the first and to the second dimensional axis of transformation base. According to this point of view, the first image point dimension, i.e. the x-direction or the horizontal direction of each individual image, represents a third dimensional axis, in a third dimension, of the transformation base, which is oriented orthogonally to the first and to the second dimensional axis of the transformation base, so that the transformations base spans a transformation space. According to this point of view, the image point plane is perpendicular to the first dimension of the transformation base, which is also referred to as t-axis.

Based upon this transformation base formed for a respective current individual image to be treated, according to the method according to the invention, a displacement is effected of at least one image point of the current individual image from a current image point position, illustrated by current sizes or amounts in the first and second dimension, to a new image point position, also illustrated by the respective sizes in the first and second dimension, by executing, for in each case one image point to be displaced, the steps explained in the following.

First, a first image point position in the first individual image, i.e. in the preceding individual image, the position assigned to or corresponding to the image point of the current individual image to be displaced, is determined based upon the image motion information describing the motion flow or optical flow from the first individual image to the current individual image. Similarly, a second image point position in the second individual image, i.e. the individual image downstream in time, the position assigned to the current image point, is determined based upon the image motion information describing the motion flow or optical flow of the current individual image to the second individual image. After that, a first interpolation point assigned to the start time, represented by a straight line extending along the second dimension of the transformation base, is identified in the transformation base based upon the previously determined first image point position and the current image point position. Similarly, a second interpolation point assigned to the end time, represented in the transformation base by a straight line extending along the second dimension, of the current individual image is identified in the transformation base based upon the current image point position and the previously determined second image point position. The searched new image point position of the current individual image is then determined based upon an average value, which can be an arithmetically, geometrically, or otherwise determined average value, of the first and the second interpolation point in the transformation base. Subsequently, an assignment of the current image point position and the determined new image point position is detected in a storage to maintain the result of displacing the image point from the current image point position to the new image point position in a device. In the present application, the interpolation pints are also referred to as intersection points.

Particularly the above described configuration of the transformation base by a targeted arrangement of the individual images in the transformation base, the determination of the interpolation points or intersection points in the transformation base and the determination of the new image point position, in the two-dimensional image point pane, based upon the average value of the interpolation values or intersection points, allow an excellent rectification and stabilization, i.e. a removal of the wobbling effect of the sequence, of a moving image sequence. The method according to the invention is thus characterized by a particularly good rectification and stabilization performance. Furthermore, by the combination of the motion information regarding the first and the current individual image on the one hand and the motion information regarding the current and the second individual image on the other hand, i.e. consideration of motion information into a past and a future of the current individual image, a high robustness and a very good error tolerance is achieved. In particular, the method is capable of achieving a stabilization of the recorded moving image sequence against vertical shocks or wobbling. The method according to the invention can particularly well balance shock-type image offsets. Furthermore, the method according to the invention is not further influenced by an optical wide-angle distortion, a so-called fish eye effect, of the image sensor detecting in the moving image sequence. Furthermore, despite the distortion of the moving image sequence, a fish eye effect possibly provided in the image sensor is maintained. Furthermore, the method is robust against sensor noise and also erroneous sections in the motion flow information or the vector field of the optical flow or optical movement. Furthermore, the method can be implemented easily and can be adapted efficiently on multiple cores. Furthermore, the method is also well suitable for a calculation on a dedicated graphics processing unit, a GPU. Since the method according to the invention only requires, besides the current individual image, the first and second individual image as a predecessor or successor individual image, the method is also particularly well suitable for real time applications.

According to another embodiment of the method according to the invention, the first interpolation point is identified based upon a first line running in the transformation base through the first image point position and the current image point position. Alternatively, or additionally, the second interpolation point is identified based upon a second lie running in the transformation base through the second line and the second image point position. By this specific configuration of the determination of the interpolation points, the method according to the invention can be realized in a particularly efficient manner.

According to a further development of the above-mentioned embodiment of the method according to the invention, the first and/or the second line is determined by a respective linear, quadratic, or cubic function in the transformation base. The method can be realized in a particularly efficient manner when the line is realized by a linear function, i.e. a straight line. The consideration or a quadratic or cubic function allows consideration of a movement an/or acceleration estimation of an image point position from a first individual image to a second individual image for the image rectification in a particularly efficient manner.

According to yet another development of the above-mentioned embodiments of the method according to the invention, the first interpolation point is identified as an intersection point of the first line with a start time axis assigned to the start time of the current individual image, which extends along the transformation base along the second dimension and which, with respect to the moving image sequence time axis, represents the time start limit of the current individual image or the very left side of the current individual image. Alternatively, or additionally, the second interpolation point is identified as an intersection point of the second line with an end time axis assigned to the end time of the current individual image, which extends in the transformation base along the second dimension and which, with respect to the moving image sequence time axis, represents the image end limit of the current individual image or the very right side thereof.

According to a particularly advantageous embodiment of the method according to the invention, the new image point position of the current image point is determined for the second dimension of the image point plane, i.e. the y-direction, as an (arithmetic, geometric or otherwise determined) average value of the positions of the first intersection point and the second intersection point in the second dimension of the transformation plane, i.e. the respective positions of the intersections points in the direction of the time succession time axis or the y-axis.

As a result, a particularly effective image stabilization and image rectification can be achieved.

According to another advantageous embodiment of the method according to the invention, a new image point position is determined also for the first dimension of the image point plane, i.e. the x direction, as an (arithmetic, geometric or otherwise determined) average value of the positions of the first and second intersection point in the third dimension of the transformation base.

As a result, a particularly efficient image stabilization and image rectification can be achieved.

According to another advantageous embodiment of the method according to the invention, the determination of the new image pint position if the current image point is effected by an identification, preferably calculation, of a first correction offset in the first dimension of the image point plane, i.e. along the horizontal axis of the current individual image. Alternatively, or additionally, in particular a second correction offset in the second dimension of the image point plane, i.e. with respect to the coordinate value in the y-axis or the vertical axis of the current individual image, is determined based upon the first and second image point position only in the second dimension of the image point plane, i.e. the respective y-axis values thereof, and the current image point position, i.e. the y-axis of the current image point position.

In addition, as a supplement or as a more specific configuration of the above described embodiment according to the invention, the identification of the first and/or second correction offset can be effected based upon a predetermined speed, which preferably is a row succession speed and particularly preferably an individual image detection speed or a row detection speed of a CMOS sensor, which previously has detected the moving image sequence to be transformed, and/or based upon a predetermined row dimensional size, which is preferably intrinsic to the CMOS sensor, which has previously detected the for the transformation of the moving image sequence.

This and the above-mentioned embodiments allow the determination of the image point position of the current image point with a particularly efficient calculation effort.

According to another advantageous embodiment of the method according to the invention, the transformation base comprises a third dimension, which is orthogonal to the first and second dimension of the transformation base, wherein the image point planes of the individual images are arranged parallel to one another in the plane orthogonal to the first dimension of the transformation base, and thus along the second and third dimension of the transformation base. Accordingly, the vertical axis of each individual image is in the second dimension of the transformation base, so that the vertical axis of each individual image, i.e. the second image point dimension, and the second dimensional axis of the transformation base, are oriented at least parallel to one another are preferably are identical. The latter case is assumed, without being limited thereto, for the description of the embodiments. Thus, the vertical axis of each individual image. i.e. the second image point dimension of the image point plane, matches the second dimension of the transformation base. The corresponding axes in the second image point dimension and the second dimension of the transformation base are thus also consistently referred to as y-axis.

According to another advantageous embodiment of the method according to the invention, the first individual image is spaced from the current individual image following in the moving image sequence by a first individual image distance of three, preferably of two, and particularly preferably of exactly one individual image. Furthermore, the second individual image is spaced from the current individual image preceding in the moving image sequence by a second individual image distance of three, preferably or two, and particularly preferably of exactly one individual image. In this case, both for the first and the second individual image distance, an individual image distance of one means that the first or the second individual image are directly adjacent to the current individual image. The rectification of the moving image sequence and the stabilization thereof can be achieved in a particularly efficient manner when the first individual image, the current individual image and the second individual image are located directly adjacent to one another, i.e. the first ad the second individual distance are in each case one.

Furthermore, the invention provides an application method for image rectification and image stabilization of a moving image sequence recorded with a COS sensor by application of one of the above described embodiments according to the invention of the method to the recorded moving image sequence.

Moreover, the following invention includes a moving image sequence transformation device which is formed for the execution of one of the embodiments of the method according to the invention.

Furthermore, the invention comprises a chip, which is equipped with hardware architecture for the execution of one of the embodiments of the method according to the invention.

Furthermore, am embodiment according to the invention comprises a camera unit having a CMOS sensor. The camera unit is formed for image rectification and image stabilization, after completion of recording of a moving image sequence or in real time while recording, of the moving image sequence recorded with the CMOS sensor by application of one of the above-described embodiments of the method according to the invention.

According to another embodiment according to the invention, a computer program product is provided, having a program code for the execution of one of the embodiments of the method according to the invention on a computer executing the program code or being provided for executing the program code.

Another embodiment of the invention comprises a data carrier having a program code recorded thereon for the execution of one of the embodiments of the method according to the invention on a computer.

Further advantageous embodiments result from the combination of at least two of the embodiments according to the invention described above or hereinafter, provided such combination is not obviously absurd.

Features disclosed in conjunction with the method are to be understood as being disclosed and claimable for a device as well.

BRIEF DESCRIPTION OF THE DRAWINGS

Exemplary embodiments of the invention will be explained by means of the attached figures, in which.

DETAILED DESCRIPTION

Figure 1:
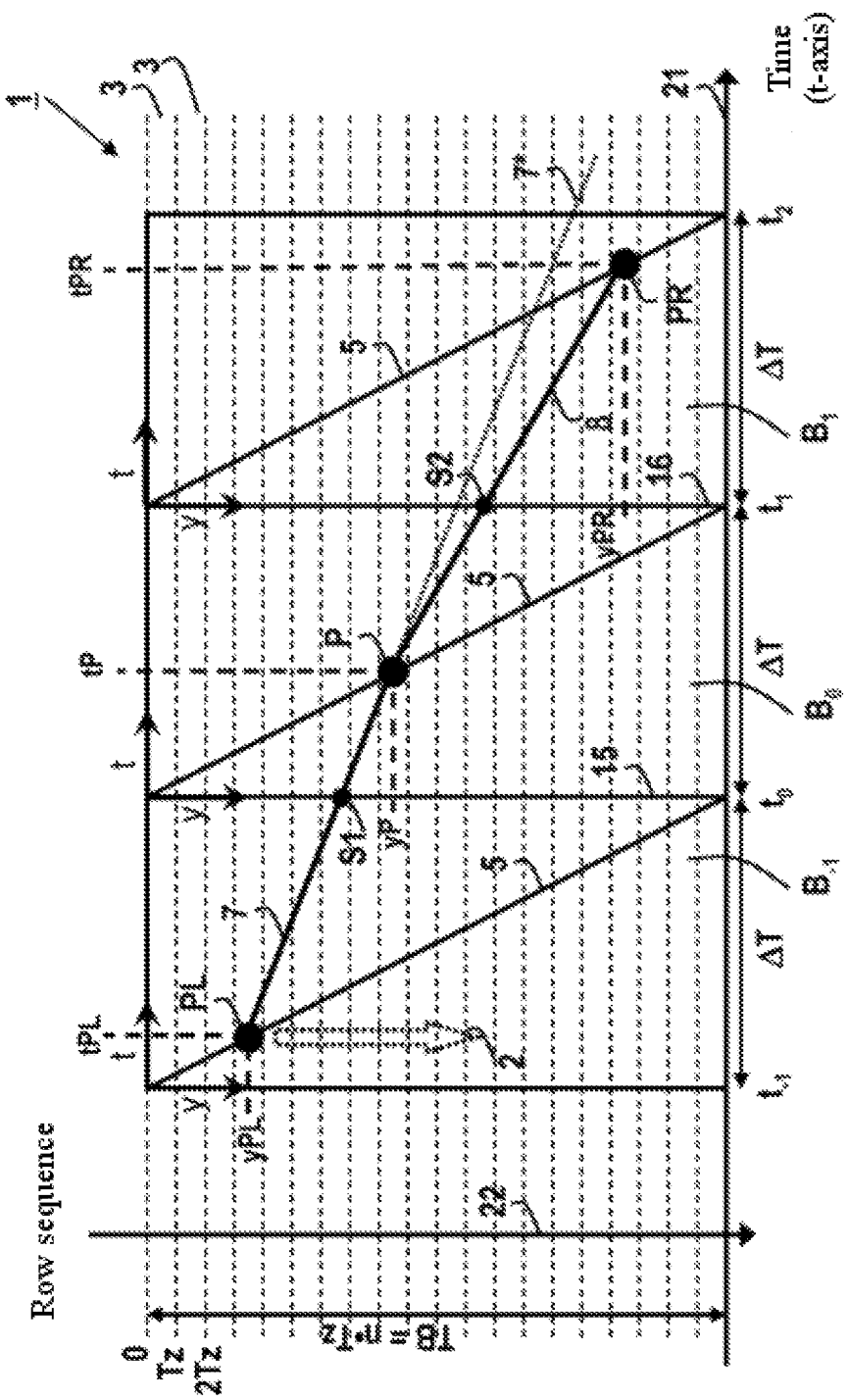
FIG. 1 shows an illustration of a transformation base formed according to the invention with a first individual image, a current individual image and a second individual image.

Throughout the drawings, like reference numerals indicate like or similar components. A repeated, figure-related explanation of components provided with like reference numerals will be omitted for reasons of clarity of the illustration of the invention.

FIG. 1 shows an exemplary view of a transformation base determined according to the method according the invention, which serves as a basis for determining the new image point position of the image point to be displaced of the current individual image. The transformation base 1 illustrated in FIG. 1 extends along a first dimension and a second dimension of the transformation base, i.e. horizontally along a moving image sequence 21 and vertically along a time succession time axis 22. A third dimension of the transformation base, which extends orthogonal to the first and second dimension, is not illustrated for reasons of a better understanding of the following explanations. Along the moving image sequence 21 as the first dimensional axis of the transformation base 1, start times $t_{-1}$, $t_0$, $t_1$ of a first individual image $B_{-1}$, $B_0$, $B_1$ and the associated end times $t_0$, $t_1$, $t_2$ thereof are plotted, the respective individual images extending in each case along the first dimensional axis 21 across a time interval $\Delta T$. In the second dimensional axis, orthogonal to the first dimensional axis and representing a row sequence of an individual image, the individual rows 3 are indicated by horizontal dashed lines running parallel to one another.

The relative points of time are indicated on the left side of FIG. 1 as multiple integers of Tz, to which is detected a respective row 3 within an image detection time TB of an individual image.

According to FIG. 1, the first uppermost image row is detected at a relative point of time 0, while the subsequent image row is detected at a relative point of time Tz, and the further subsequent image row is detected at a point of time 2Tz, and the lowest row is detected with the largest delay, i.e. (n−1) times Tz.

In the transformation base 1 illustrated in FIG. 1, a first individual image $B_{-1}$, a current image $B_0$, and a second individual image $B_1$, which follow directly one after the other and thus have individual image distances to one another of in each case one, are arranged in the transformation base 1 such that the horizontal direction of each individual image, i.e. in the first image point dimension of each individual image, runs parallel to a row detected at the same relative point of time. The three individual images ($B_{-1}$, $B_0$, $B_1$) are further arranged in the transformation base 1 such that the vertical direction of these individual images, i.e. the y-axis in the second image point dimension thereof, are oriented to match with the row succession axis 22, i.e. the second dimension of the transformation base. The row-dependent delay time within a respective individual image is illustrated in FIG. 1 by the relative points of time illustrated on the left side of FIG. 1 on the one hand, and on the other hand by a detection delay time diagonal 5 running obliquely through each individual image from top left to at the bottom right. An image point P to be displaced of the current individual image $B_0$ with the positions or time and image point position tP in the direction of the t-axis of the individual image and yP in the direction of the y-axis of the individual image is thus located on the detection delay time diagonal 5 associated to this individual image $B_0$. The start in time of the current individual image $B_0$ is located in the transformation base 1 on the moving image time axis at the position of $t_0$, and the image start in time or the image start limit or boundary of the current individual image is characterized by the one of the vertically and straight running start time axis 15. Accordingly, the time end of the current individual image is characterized in the transformation base by the vertically running end time axis 16 at end time $t_1$. The image point positions determined by the respective image motion information in the first individual image $B_{-1}$ and the second individual image $B_1$, which are assigned to the current positions tP, yP, are located in the respective individual image also on the respective detection delay time diagonal 5 with positions or time and image point position tPL and yPL for the first individual image and tPR and yPR for the second individual image.

The arrow 2 shown in a dashed manner and oriented downward in FIG. 1 is to illustrate the movement of the image points PL, P, PR, which are assigned to one another via the respective image motion information, exemplary underlying the illustration in FIG. 1. Specifically, FIG. 1 is to illustrate a vertically downward and accelerated movement of the individual image content of individual image $B_{-1}$ to the current individual image $B_0$ to the next individual image $B_1$. According to the acceleration, the displacement of the respective point PL, P or PR increases on the respective detection delay time diagonal 5 toward the bottom right, which illustrates that the respective image point is detected within the individual image time interval ΔT at an increasing later relative point of time within the respective individual image.

A first line 7 is set as a connecting line from the first time and image point position tPL, yPL of the first individual image $B_{-1}$ to the current image point position tP, yP of the current individual image $B_0$, and this line 7 intersects the start time axis 15 of the current individual image $B_0$ in the intersection point S1. Similarly, a line 8 was identified or determined in the transformation base 1, which runs through the time and image point position tP, yP of the current individual image $B_0$ and through the second time and image point position tPR, yPR of the second individual image $B_1$. This line 8 intersects the end time axis 16 in the intersection point S2. Since in FIG. shows the exemplary case of a vertical acceleration of an image point or the content associated with it, line 8 has a greater slope compared over line 7, which can be clearly discerned from the extension of line 7 shown as a dashed line 7*.

Figure 2:
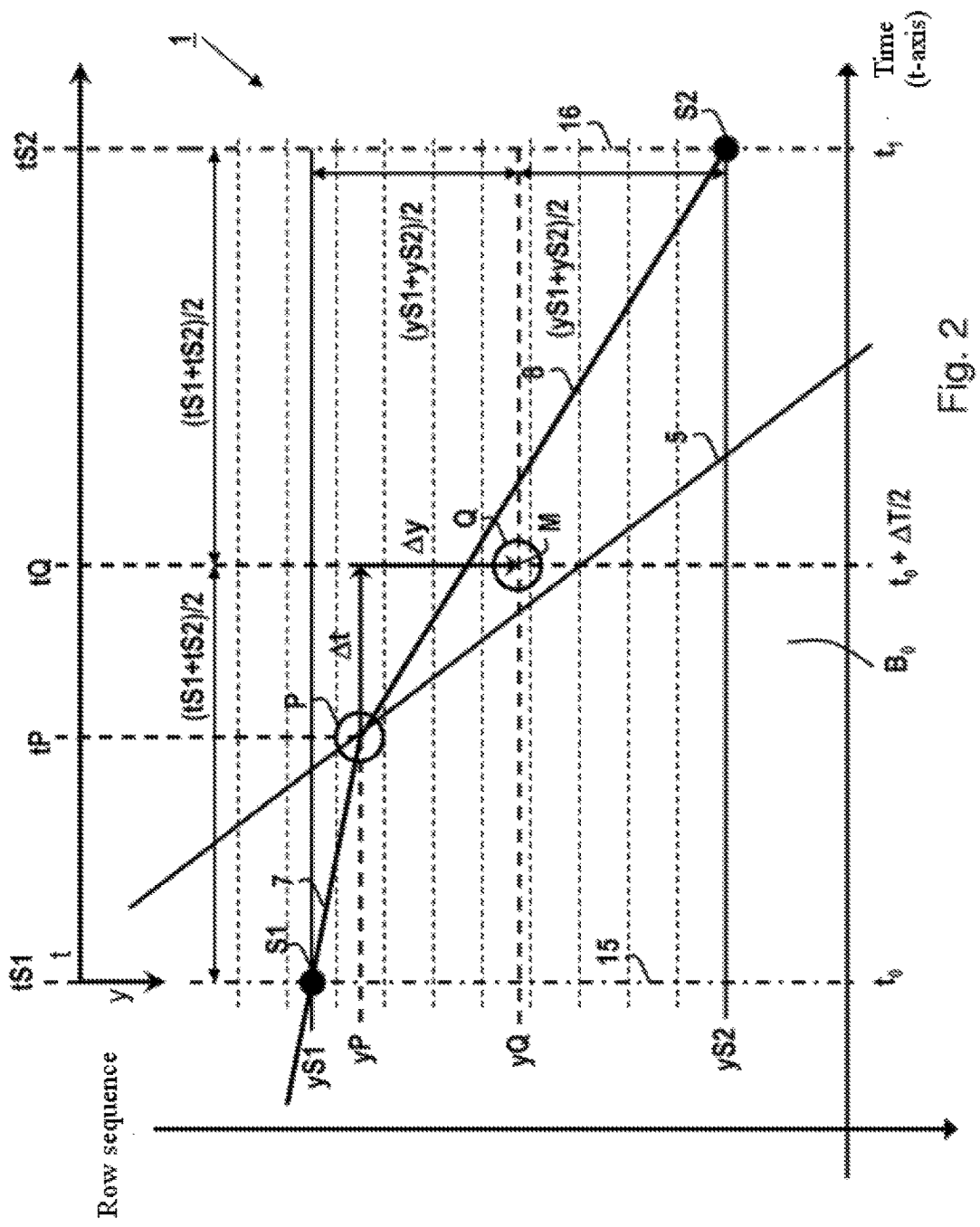
FIG. 2 shows a section of the transformation base according to FIG. 1 used for the determination of the new image point position.

FIG. 2 is a section focused to the section of the current individual image $B_0$ of the transformation base 1 formed according to the invention. The general explanations with respect to FIG. 1 also apply to FIG. 2. In contrast, FIG. 2 illustrates more specifically how the new time and image point position tQ, yQ is determined based upon the current time and image point position tP, yP. As illustrated in FIG. 2, the first intersection point S1 is determined as the intersection point of the first line 7, which connects the first time and image point position tPL, yPL with the current time and image point position tP, yP, and the time start axis 15 of the current individual image by the time and image point positions tS1, yS1. The intersection point S2 is determined by the time and image point positions tS2, yS2. As illustrated in FIG. 2 in an exemplary manner, the new time and image point position in the current individual image $B_0$ is determined based upon an average value of the first and second interpolation point or intersection point S1 and S2. The new image point position yQ of the current image point is determined for the second dimension, i.e. the y-axis of the current individual image, as an average value of yS1 and yS2. Thus, the following equations apply:

$$yQ=(yS1+yS2)/2$$

or:

$$yQ=yS1+|yS1-yS2|/2.$$

or even:

$$yQ=yS2-|yS1-yS2|/2.$$

For the second image point position y, which runs orthogonally in the image to the y-axis and determines the pixel position:

$$xQ=(xS1+xS2)/2$$

or:

$$xQ=xS1+|xS1-xS2|/2.$$

or even:

$$xQ=xS2-|xS1-xS2|/2.$$

FIG. 2 also shows the embodiment of the method according to the invention, in which averaging the intersection point positions or interpolation point positions is effected in the direction of the t-axis of the individual image $B_0$. Accordingly, the new time tQ is defined as:

$$tQ=(tS1+tS2)/2.$$

Since the positions of the intersection points S1 and S2 in the direction of the t-axis are always fixedly determined by the start time axis 15 and the end time axis 16 of the current individual image $B_0$, the new time position in the first axis, i.e. tQ, according to this embodiment is located always on the same point, which however does not apply to the new time position tQ in the second dimensional axis.

FIG. 2—for the illustration of another embodiment of the method according to the invention—illustrates a correction offset Δy in the direction of the y-axis, respectively the second dimension of the transformation base 1, and FIG. 2 emphasizes the determination of the new time and image point position tQ, xQ, yQ.

$$xQ := xP + \Delta J$$

$$yQ := yP + \Delta J$$

$$tQ := tP + \Delta J$$

The determination of tQ or Δt in the first dimension of the transformation base, as illustrated in FIG. 2, is a mathematic tool in order to finally be able to calculate the decisive correction amounts in the two-dimensional image point plane from the three-dimensional transformation base.

The first correction offset Δx and the second correction offset Δy are finally determined, after a mathematic transformation of Δx, Δy and Δt as follows:

$$\Delta x = -(xPL \cdot yPR \cdot v^2 \cdot yP + xPR \cdot yPL \cdot v^2 \cdot yP - h \cdot xPR \cdot v \cdot yP + h \cdot xPL \cdot v \cdot yP - h \cdot xPR \cdot yPL \cdot v + h^2 \cdot xPR)/2(yPL \cdot v - h)(yPR \cdot v + h)$$

$$\Delta y = -(2 \cdot yPL \cdot yPR \cdot v^2 \cdot yP - h \cdot yPR \cdot v \cdot yP + h \cdot yPL \cdot v \cdot yP - h \cdot yPL \cdot yPR \cdot v + h^2 \cdot yPR)/2(yPL \cdot v - h)(yPR \cdot v + h)$$

The variable v in the above two formulas refers to a predetermined speed, which preferably is a row succession speed and particularly preferably a row detection speed of a CMOS sensor, which previously has detected the moving image sequence to be transformed. The variable h in the above two formulas is a predetermined row dimension size, which is preferably intrinsic to the CMOS sensor, which has previously detected the moving image sequence to be transformed, and particularly preferably the height of the CMOS sensor, i.e. the extension thereof in the second dimension.

Figure 3:
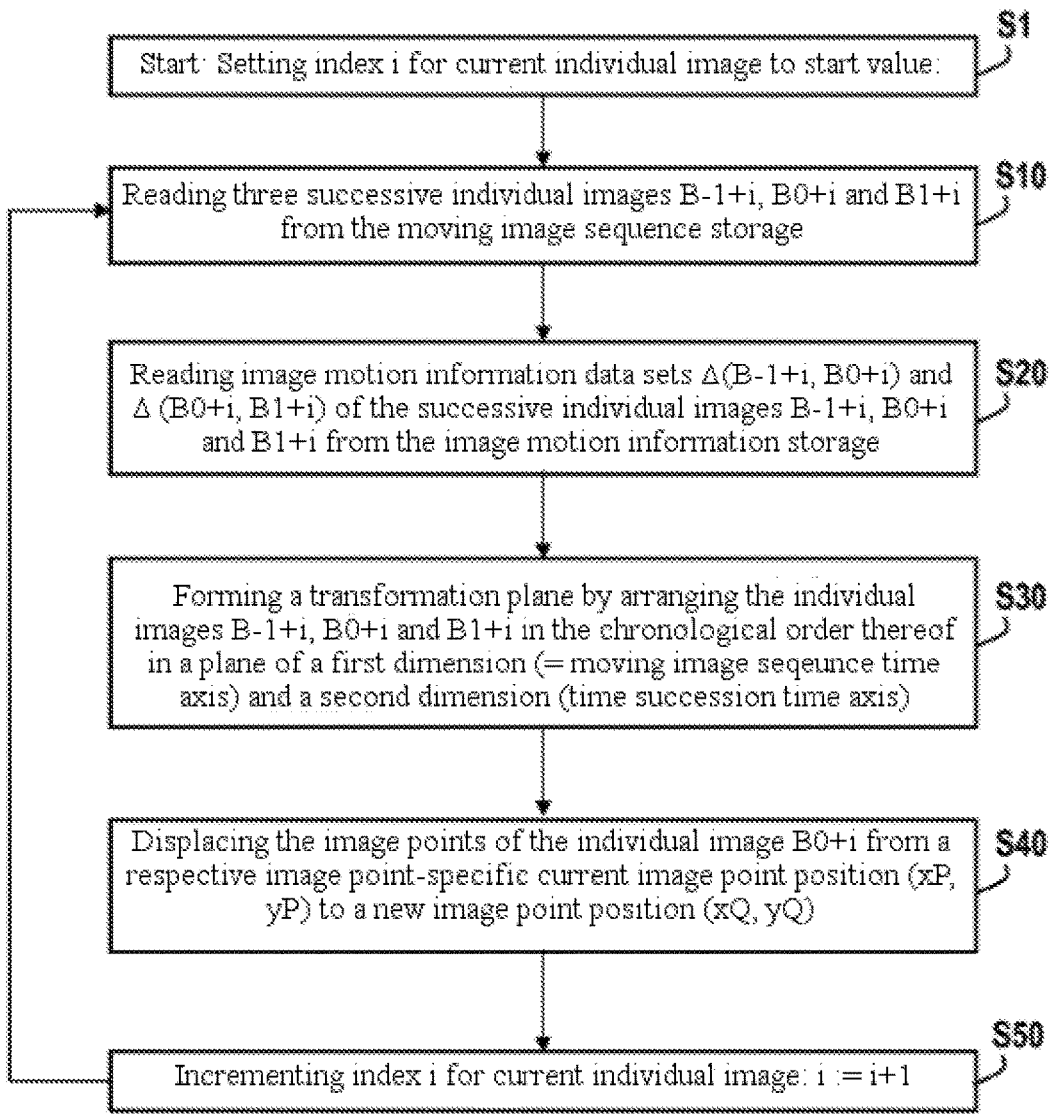
FIG. 3 shows a flow diagram, which schematically illustrates the transformation of a moving image sequence with the method according to the invention.

FIG. 3 shows a flow diagram, which illustrates an exemplary course or flow of an embodiment according to the invention of the method for the transformation of a moving image sequence. In a first step, an index I, which in each case points to the current individua image in the type of an index, is set at a start value (I:=0). Subsequently, steps S1ß to S50 are iteratively performed for the transformation of the moving image sequence. First, in step S10, three successive individual images $B_{-1+i}$, $B_{0+i}$, and $B_{1+i}$ are read out from a moving image sequence storage. Furthermore, in step S20, a first image motion information data set $\Delta(B_{-1+I}$ and $B_{1+i})$ which describes the optical flow or optical motion from the first individual image $B_{-1+i}$ to the current individual image $B_{0+1}$, and a second image motion information data set $\Delta(B_{0+i}, B_{1+i})$, which describes the optical flow or optical motion from the current individual image $B_{0+i}$ to the second individual image $B_{1+i}$, are read from the image motion information storage. Subsequently, in step S30, the transformation base 1 is formed by arranging the individual images $B_{-1+i}$, $B_{o+i}$ and $B_{1+i}$ read in step 10 in the chronological order thereof along the moving image sequence time axis. Subsequently, in step S40, a displacement is effected of at least one image point of the individual image $B_{0+1}$ from the respective image point-specific current image point position xP, yP to the new image point position xQ, yQ to be determined. Once the image points of the individual image $B_{0+i}$ selected for the transformation have been displaced toward to the respective new image point positions, the index i (or the counter thereof) for the current individual image is increased by one, followed by the repetition of steps S10 to S50 for the next individual image set by the index i and increased by one.

Figure 4:
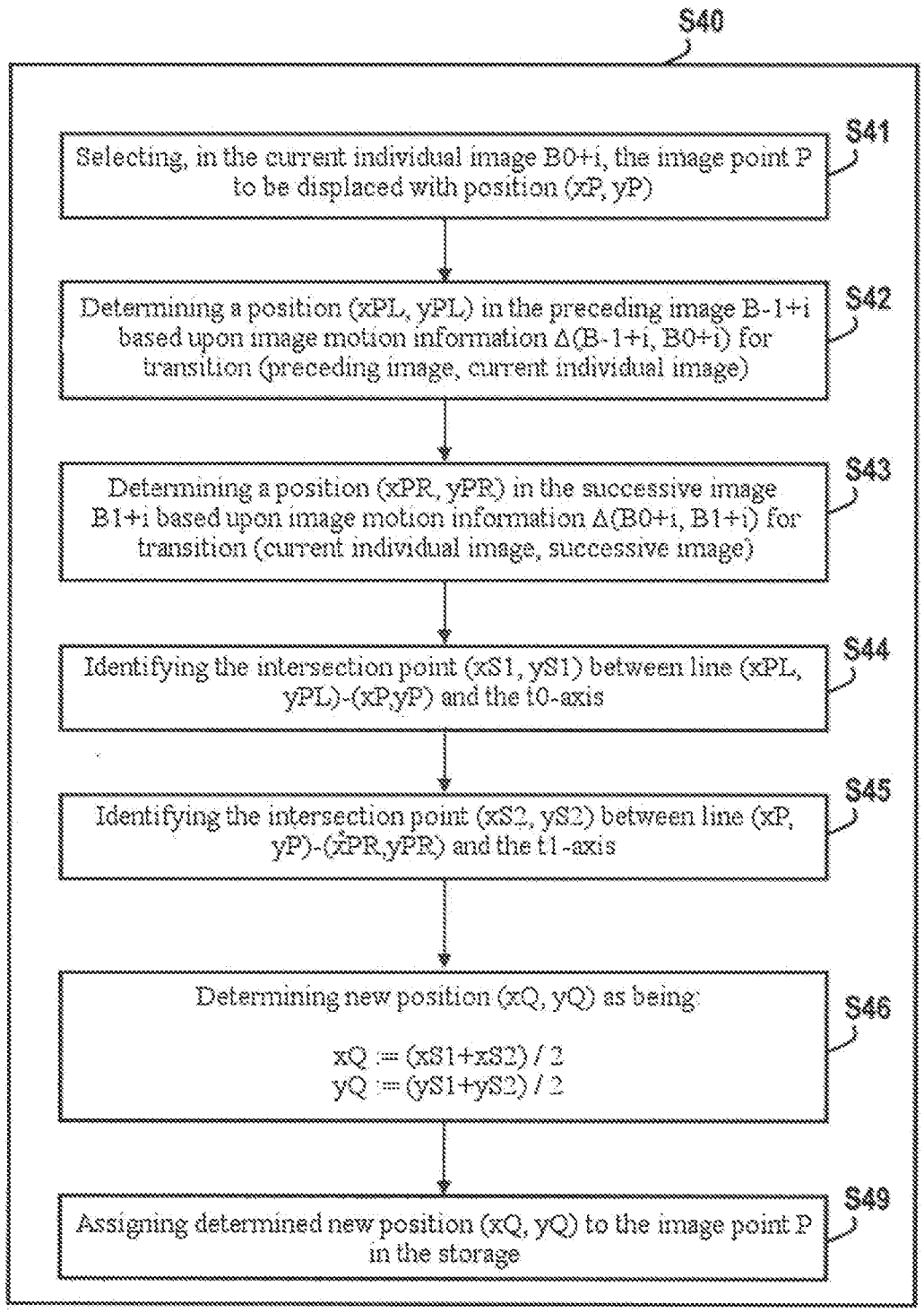
FIG. 4 is a flow diagram, which illustrates an embodiment of the step of displacing an image point in greater detail mentioned in FIG. 3.

The flow diagram in FIG. 4 shows an embodiment according to the invention of step S40 shown in FIG. 3. The realization of step S40 essentially corresponds to the determination of the new positions xQ, yQ via the respective average values of the intersection points positions.

Figure 5:
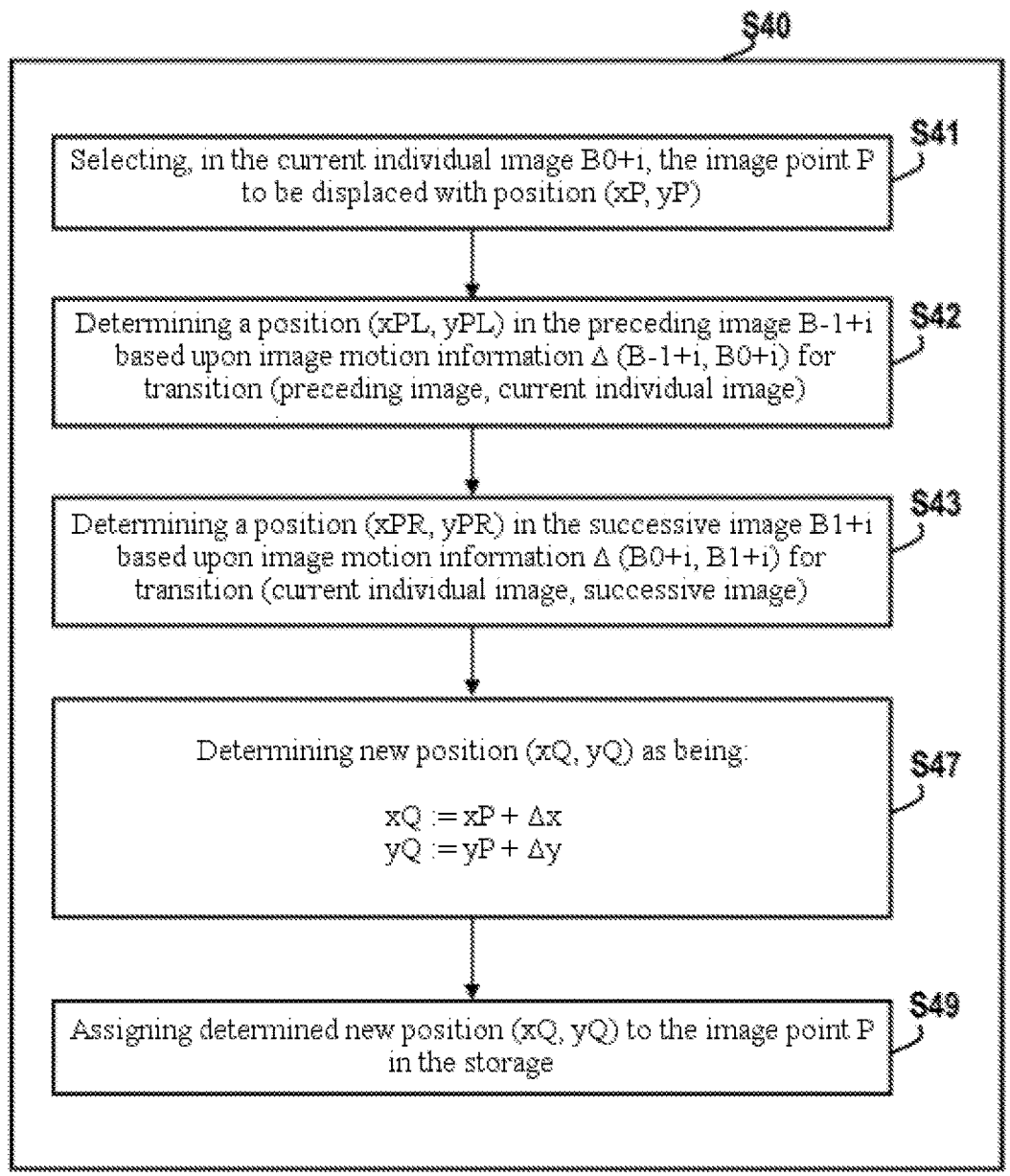
FIG. 5 is a flow diagram, which illustrates another embodiment of the step of displacing an image point in greater detail mentioned in FIG. 3.

FIG. 5 shows another embodiment of step S40 stated in FIG. 3 according to the invention. The determination indicated in FIG. 5 in step 47 of the new position xQ, yQ is based upon the determination of the first correction offset Δx and the second correction offset Δy by using the above indicated formulas for the determination of the first or second correction offset Δx and Δy.

The present invention is not limited to the embodiments shown and described here in an exemplary manner. The scope of protection of the invention is rather defined by the attached claims.

The invention claimed is:

1. Method for the transformation of a moving image sequence, in particular for rectification and stabilization of images, comprising the steps of:
   providing, in a moving image sequence storage, a moving image sequence with a plurality of individual images ($B_{-1}$, $B_0$, $B_1$) successive in time and assigned to time intervals (ΔT), which are set by a respective start time ($t_{-1}$, $t_0$, $t_1$) and end time ($t_0$, $t_1$, $t_2$), wherein each individual image is composed of a plurality (n) of lines (3) that comprise image points, which are in each case assigned to a time (0, Tz, 2Tz) different to one another within the time interval assigned to the individual image, wherein an image point position (x, y) in an image point plane having a first image point dimension (x) and a second image point dimension (y) is assigned to each image point;
   providing, in a moving image information storage, a moving image information ($\Delta(B_{-1}, B_0)$, $\Delta(B_0, B_1)$), which describes a motion flow between individual images of the moving image sequence;
   transforming the moving image sequence by repeating the steps, for the plurality of individual images successive in time, of:
   forming a transformation base (1) assigned to a current individual image ($B_0$) to be treated and having a moving image sequence time axis (21) as a first dimensional axis and a line succession time axis (22) as a second dimensional axis orthogonal to the first dimensional axis by arranging the current individual image ($B_0$), a first individual image ($B_{-1}$), which is different from the current individual image, and a second individual image ($B_1$), which is different from the current image and from the first individual image, in a chronological order of the respective start times ($t_{-1}$, $t_0$, $t_1$) and end times ($t_0$, $t_1$, $t_2$) of the current, first and second individual images (13-1, $B_0$, $B_1$) along the first dimensional axis (21), wherein the lines (3) of current, first and second individual images ($B_{-1}$, $B_0$, $B_1$) assigned to the same relative points of time are arranged next to one another along the second dimensional axis (22);

displacing at least one image point (P) of the current individual image ($B_0$) from a current image point position (xP, yP) to a new image point position (xQ, yQ) by executing, for a respective image point to be displaced, the steps of:

determining, for a current image point (P) to be displaced of the current individual image ($B_0$), a first image point position (xPL, yPL) in the first individual image ($B_{-1}$) assigned to the current image point based upon a first image motion information ($\Delta(B_{-1}, B_0)$);

determining, for the current image point (P) of the current individual image ($B_0$), a second image point position (xPR, yPR) in the second individual image ($B_1$) assigned to the current image based upon a second image motion information ($\Delta(B_0, B_{-1})$);

identifying a first interpolation point (S1) in the transformation base (1) assigned to a start time ($t_0$) of the current individual image based upon the determined first image point position (xPL, yPL) and a current image point position (xP, yP);

identifying a second interpolation point (S2) in the transformation base (1) assigned to an end time ($t_1$) of the current individual image based upon the current image point position (xP, yP) and the determined second image point position (xPR, yPR);

determining a new image point position (xQ, yQ) of the current image point (P) of the current individual image ($B_0$) based upon an average value of the first and the second interpolation point (S1, S2); and detecting an assignment of the current image point (P) and the determined new image point position (xQ, yQ) in a displacement image storage and/or transformation moving image sequence storage.

2. Method according to claim 1, wherein the first interpolation point (S1) is identified based upon a first line (7) running through the first image point position (xPL, yPL) and the current image point position (xP, yP) in the transformation base (1), and/or wherein the second interpolation point (S2) is identified based upon a second line (8) running through the current image point position (xP, yP) and the second image point position (xPR, yPR) in the transformation base (1).

3. Method according to claim 2, wherein the first line (7) and/or the second line (8) are determined by a respective linear, quadratic, or cubic equation.

4. Method according to claim 2, wherein the first interpolation point (S1) is identified as an intersection point of the first line (7) with a start time axis (15) assigned to the start time ($t_0$) of the current individual image ($B_0$) and extending in the transformation base along the second dimensional axis, and/or wherein the second interpolation point (S2) is identified as an intersection point of the second line (8) with an end time axis (16) assigned to the end time ($t_1$) of the current individual image ($B_0$) and extending in the transformation base along the second dimensional axis.

5. Method according to claim 1, wherein the new image point position (yQ) of the current image point for the second image point dimension (y) of the image point plane is determined as an average value of positions of a first (yS1) and second (yS2) intersection point in the second image point dimension of the transformation base.

6. Method according to claim 1, wherein the new image point position (xQ) of the current image point for the first image point dimension (x) of the image point plane is determined as an average value of positions of a first (xS1) and second (xS2) intersection point in a third dimension of the transformation base.

7. Method according to claim 1, wherein determining the new image point position of the current image point is effected by a first identification, in particular calculation, of a first correction offset ($\Delta x$) in the first image point dimension of the image point plane, which is identified based upon the first and second image point position each in the first and second image point dimension of the image point plane, an actual image point position only in the second image point dimension of the image point plane, and/or by a second identification, in particular calculation, of a second correction offset ($\Delta y$) in the second image point dimension of the image point plane, which is identified based upon the first and second image point position in the second image point dimension only of the image point plane and the current image point position in the second image point dimension only of the image point plane.

8. Method according to claim 7, wherein identifying the first ($\Delta x$) and/or the second ($\Delta y$) correction offset is effected further based upon a predetermined speed (v), and/or a predetermined line dimension size (h).

9. Method according to claim 1, wherein the transformation base (1) comprises a third dimension (x), which is orthogonal to the first (t) and second (y) dimensional axes of the transformation base, and wherein the image point planes of the current, first and second individual images are arranged in a plane orthogonal to the first dimensional axis (t) of the transformation base and thus along the second dimensional axis (y) and third dimension of the transformation base, and in particular the second image point dimension and the second dimensional axis of the transformation base coincide.

10. Method according to claim 1, wherein the first image motion information ($\Delta(B_{-1}, B_0)$) describes a change of a first individual section position assigned to an individual image section in an individual image of the moving image sequence in relation to a second individual section position assigned to the same individual image section in an individual image next in terms of time to the individual image.

11. Method according to claim 1, wherein the first individual image ($B_{-1}$) is spaced from the current individual image ($B_0$) following in the moving image sequence by a first individual image distance of three, individual images, and the second individual image ($B_1$) is spaced from the current individual image ($B_0$) preceding in the moving image sequence by a second individual image distance of three individual images.

12. Application method for image rectification and image stabilization of a moving image sequence recorded with a CMOS sensor, comprising an application of the method according to claim 1.

13. Moving image sequence transformation device, which is configured for executing the method according to claim 1.

14. Chip with a hardware architecture which is configured for executing the method according to claim 1.

15. Camera unit with a CMOS sensor, which is configured for image rectification and image stabilization, after completion of a recording of a moving image sequence or in real time while recording, of the moving image sequence recorded with the CMOS sensor by applying the method according to claim 1 to the recorded moving image sequence.

16. A non-transitory computer-readable medium encoded with a program code for execution of the method according to claim 1 on a computer executing the program code.

17. Method according to claim 1, wherein the first individual image ($B_{-1}$) is located ahead in time from the current individual image, and wherein the second individual image ($B_1$) is successive in time from the current individual image.

18. Method according to claim 8, wherein the predetermined speed (v) is an individual image detection speed or a row detection speed, of a CMOS sensor having detected the moving image sequence to be transformed, and wherein the predetermined line dimension size (h) is of the CMOS sensor having detected the moving image sequence to be transformed.

19. Method according to claim 10, wherein the first individual section position is an image point, and wherein the change is based upon a vector information.

20. Method according to claim 11, wherein the first individual image distance is exactly one individual image, and wherein second individual image distance is exactly one individual image.

* * * * *